Figure 1:
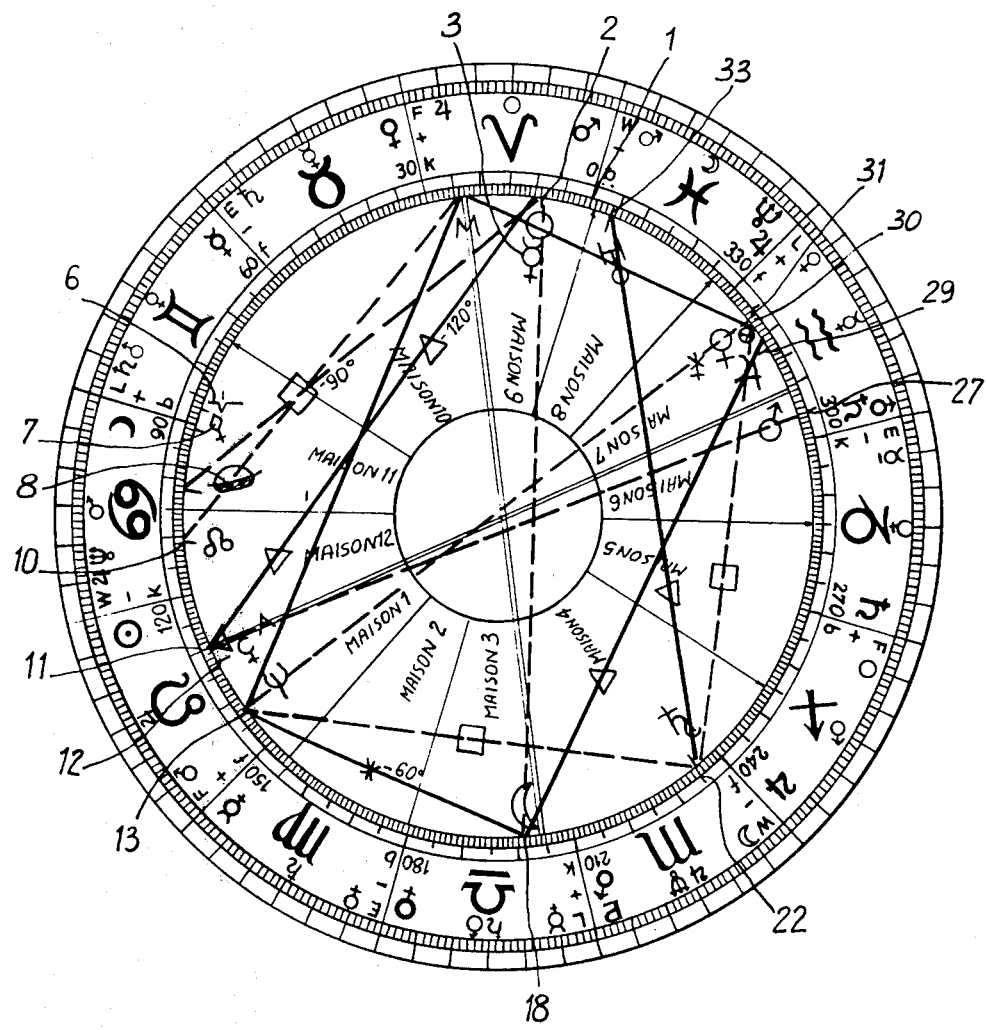

United States Patent [19]

Trenkle

[11] 4,117,608

[45] Oct. 3, 1978

[54] ASTROLOGICAL DEVICE

[76] Inventor: Eckhart Trenkle, 38 Passage Choiseul, Paris, France

[21] Appl. No.: 780,493

[22] Filed: Mar. 23, 1977

[30] Foreign Application Priority Data

Apr. 5, 1976 [FR] France .................. 76 09797

[51] Int. Cl.² .......................................... G09B 29/00
[52] U.S. Cl. .................................................... 35/44
[58] Field of Search .................... 35/44, 43, 23 A; 273/161

[56] References Cited

U.S. PATENT DOCUMENTS 1,587,018 6/1926 Manahan .......................... 35/43 X
2,219,378 10/1940 Booth ................................. 35/44
2,769,249 11/1956 Illes ................................. 35/23 A Primary Examiner—William H. Grieb
Attorney, Agent, or Firm—Young & Thompson

[57] ABSTRACT

An astrological device for casting horoscopes, comprises a string of 360 beads all of the same thickness but of different colors to represent different astrological data, in combination with a board on which the 12 signs of the zodiac are displayed in an annular arrangement. The rotated position of the string of beads on the board permits a quick and easy determination of the relationships of the astrological data to the signs of the zodiac and hence the quick and easy casting of the horoscope of the individual to whom the string of beads pertains.

3 Claims, 2 Drawing Figures

ASTROLOGICAL DEVICE

The present invention relates to an astrological device, particularly of the type for casting horoscopes.

To determine the essential elements of a horoscope, it is necessary to provide a representation of the astrological theme for the date, sidereal hour and particular place, the astrological theme being given in particular by the position of the sun, the moon and the principal planets along the zodiac. Thus, on the celestial sphere, the sun moves during the course of 1 year about a great circle called the ecliptic, the so-called zodiacal zone being disposed on opposite sides of the ecliptic and comprising the region through which the moon and the principal planets appear to travel. The zodiacal zone is divided into 12 rectangular areas of the same size, starting from the point where the celestial equator intercepts the ecliptic, which is the vernal equinox occurring the 21st of March, these 12 areas corresponding to the 12 signs of the zodiac.

With regard to the diurnal movement, 12 houses are determined, the limiting circles of the houses intercepting the ecliptic at 12 points. As a result, to represent an astrological theme, one ordinarily utilizes a circle which is divided into 360 parts or degrees, the 360° being themselves arranged group-wise in 12 group of 30° each, the 12 portions thus representing the 12 signs of the zodiac. On this circle, one marks for a certain date, sidereal hour and given place, the essential elements of the astrological theme, namely, the heliocentric and geocentric positions of the planets, the 12 houses, the lunar nodes, certain stars, etc. Once these elements of the astrological theme are thus positioned, one can determine the aspects, that is, the angles the stars make between each other two by two along the zodiac, or more particularly the angular projection of the starts on the ecliptic, the principal aspects being the conjunction or zero distance, the sextile or 60° distance, the quadrature or 90° distance, the trigon or 120° distance, and the opposition or 180° distance. To obtain these different aspects, it is in general necessary to use geometrical techniques.

The present invention has as its object the provision of an astrological device that overcomes the difficulties recited above, thereby permitting the rapid and simple determination of the principal astrological aspects for a given individual whose horoscope is to be cast.

The astrological device according to the present invention is characterized in that it comprises 360 elements of the same thickness, each element corresponding to 1° of arc, mounted in the form of an endless string of elements or beads, in combination with an astrological board, the 360 elements being divided into 12 groups of 30 elements each which groups are identifiable by 12 equally peripherally annularly spaced markings on the board, the space between each two adjacent markings corresponding to one sign of the zodiac.

Certain of the beads or elements in the string, however, are visibly different from the others, and represent planets, houses, lunar nodes and other astrological themes. The elements, which are all of the same thickness, may be, for example, pearls, precious stones, semiprecious stones, or other materials. The elements are fixed in place on a support comprising an endless filamentary member that traverses all of them, which may be flexible or not but is preferably flexible, for example a filament of superpolyamide or the like. The string may be knotted between the beads if desired.

Thus the elements of astrological significance, namely, the planets, houses and other astrological signs, are permanently fixed in place on the support in a predetermined order which corresponds only to the particular individual whose time and place of birth are individually represented by the particular arrangement, spacing and sequence of the different elements in the series of 360 elements.

According to another possibility, certain of the elements, such as the planets, can occupy each more than one of the 360 available spaces, in which case the elements are not all of the same thickness. Thus, for example, the sun could occupy 10°, and Venus 2°. In each case, the length of each of these larger elements would be an even multiple of the unit length of 1°.

It is also possible to color code each series of 30 elements according to a symbolic color. Thus, for example, red can be used for the fire signs such as Aries, Leo, and Sagittarius; green for the earth signs such as Taurus, Virgo and Capricorn; yellow for the air signs such as Gemini, Libra, and Aquarius; and blue for the water signs such as Cancer, Scorpio and Pisces.

Figure 2:
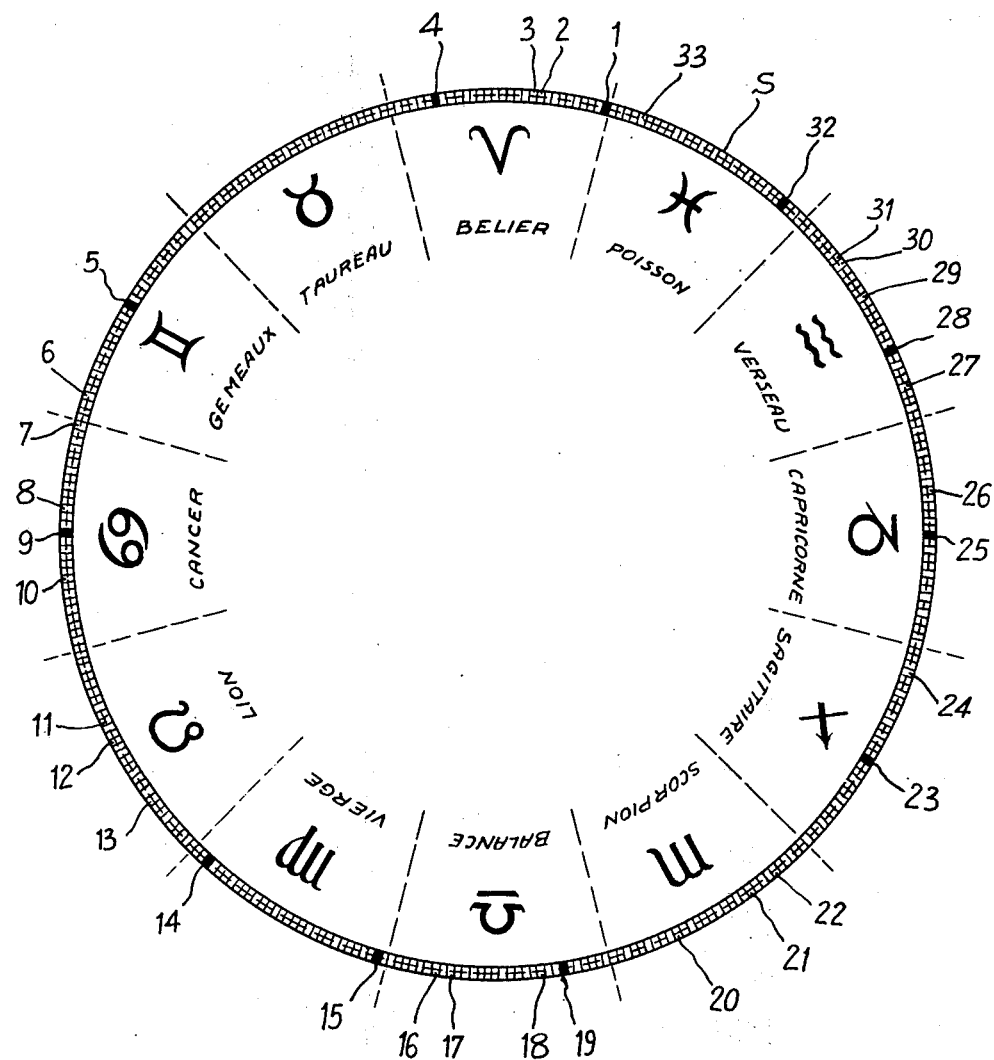

Other objects, features and advantages of the present invention will become apparent from a consideration of the following description, taken in connection with the accompanying drawings, in which:

FIG. 1 is a representation of a typical prior art astrological board for casting horoscopes; and FIG. 2 is a view similar to FIG. 1, showing the combination of an endless series of 360 elements according to the present invention and an astrological board, the outer limits of the board being unillustrated.

Referring now to the drawings in greater detail, it will be noted that in conventional astrological boards, as also in the present invention, as shown by FIG. 1, the 12 signs of the zodiac are arranged about the periphery of a circle which is thus divided into 12 sectors of 30° each. FIG. 2, which illustrates the present invention, shows a string of beads according to the present invention resting removably on a simplified such board, the string comprising 360 elements or beads of the same thickness strung on a support S which may be an endless filament of superpolyamide or other suitable support. The 360 elements are divided into 12 groups of 30 elements each, by the dash lines on the subjacent board, each group of 30 corresponding to a zodiacal sign which in the drawing is represented by its symbol.

In FIGS. 1 and 2, the same reference numerals represent the same elements, that is, the planets, the sun, the moon, the houses, etc. According to the conventional casting of an astrological horoscope, the different elements are represented by their symbols; but in the present invention, the different astrological elements are beads of different colors or designs.

Thus, reference numeral 1 in both figures represents 0° or the vernal equinox, that is, the onset of Aries, corresponding to March 21. Reference 2 represents the sun in position 9 in Aries, reference 3 showing Mercury at 10 in Aries and reference 4 the 10th house at 24 in Aries. Likewise, in Gemini, the 11th house 5 is at the 14th position and Vesta 6 is at the 27th position. In Cancer, Pallas 7 is at the first position, Pluto 8 at the 12th position, the 12th house 9 is at the 15th position and lunar node 10 at the 21st position. In Leo, ascendent 11 is at the 10th position, Ceres 12 is at the 13th position and Neptune 13 is at the 22nd position. In Virgo, the second house 14 is at the fourth position and the third house 15 at the 29th position. In Libra, heliocentric Mercury 16 is at the seventh position, hellocentric earth 17 is at the ninth position, the moon 18 is at the 21st position and the fourth house 19 is at the 24th position. In Scorpio, heliocentric Venus 20 is at the 10th position, heliocentric Saturn 21 is at the 21st position and Saturn 22 is at the 25st position. In Sagittarius, the fifth house 23 is at the 14th position, and heliocentric Mars 24 is at the 27th position. In Capricorn, the sixth house 25 is at the 15th position, and the opposite node of the moon 26 is at the 21st position. In Aquarius, Mars 27 is at the fifth position, the seventh house 28 is at the 10th position, Jupiter 29 is at the 18th position, fortune point 30 is at the 23rd position, and geocentric Venus 13 is at the 24th position. In Pisces, the eighth house 32 is at the fourth position and Uranus 33 is at the 26th position. The essential elements of the astrological theme being thus positioned, it is accordingly possible to determine the principal aspects of the horoscope.

According to the present invention, the trigons or 120° distances are determined by forming with the string of beads three circles of the same diameter, the quadratures or 90° distances are determined the same way but with four circles of the same diameter, and the sextiles or 60° distances with six circles of the same diameter, merely by bending the flexible necklace into the corresponding number of loops of the same diameter. It is thus convenient that the beads or elements in the string be spherical, like pearls, to facilitate this increased flexing of the string. When the string is thus formed into a plurality of loops, the elements representing the stars or elements having the same aspect will be side by side with each other in the different loops.

This method of casting a horoscope is thus very rapid and requires no geometrical manipulations as in the conventional devices for casting horoscopes.

From a consideration of the foregoing disclosure, therefore, it will be evident that the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

I claim:

1. An astrological device comprising in combination an endless string of 360 elements of the same thickness, in combination with an astrological board having the 12 signs of the zodiac arranged in an annular series of about the same circumference as the string of elements and with indicia marking the borders between the signs of the zodiac, whereby when the string of elements is superposed on the board, said indicia will delimit 12 groups of 30 said elements, certain of said elements being visibly different from certain others of said elements.

2. An astrological device as claimed in claim 1, in which said elements are of different colors.

3. An astrological device as claimed in claim 1, in which said endless string is flexible.

* * * * *